United States Patent [19]

Rollband

[11] 4,370,922

[45] Feb. 1, 1983

[54] NUTCRACKER

[76] Inventor: Ernest J. Rollband, 3415 Slaterville Rd., Brooktondale, N.Y. 14816

[21] Appl. No.: 231,897

[22] Filed: Feb. 5, 1981

[51] Int. Cl.³ ............................................... A23N 5/00
[52] U.S. Cl. ...................................... 99/572; 99/579; 99/580
[58] Field of Search ..................... 99/568, 571–573, 99/577–579, 581–583; 269/212, 228; 81/356–363; 30/120.1–120.5

[56] References Cited

U.S. PATENT DOCUMENTS

| | | | |
|---|---|---|---|
| 2,740,439 | 4/1956 | Dillard | 99/579 |
| 2,827,087 | 3/1958 | Connor | 99/579 |
| 3,159,194 | 12/1964 | Anderson | 99/573 |
| 3,578,047 | 5/1971 | Diggs | 99/572 |

OTHER PUBLICATIONS

Diana Branch, "Crackin' Good Nutcrackers!", *Organic Gardening*, Dec. 1980, pp. 117–124.

*Primary Examiner*—Philip R. Coe
*Assistant Examiner*—Timothy F. Simone
*Attorney, Agent, or Firm*—Michael F. Brown

[57] ABSTRACT

A nutcracker which automatically adjusts for nut size. The nut is cracked between a piston and a receiver. The receiver holds the nut and is locked into place by a latching mechanism made up of a plurality of disk elements, stacked together. A locking lever raises one or more disk elements out of place and latches against the flat face of an adjoining disk. A cover may be provided to activate the latching mechanism and cover the nut to be cracked, protecting the user.

7 Claims, 6 Drawing Figures

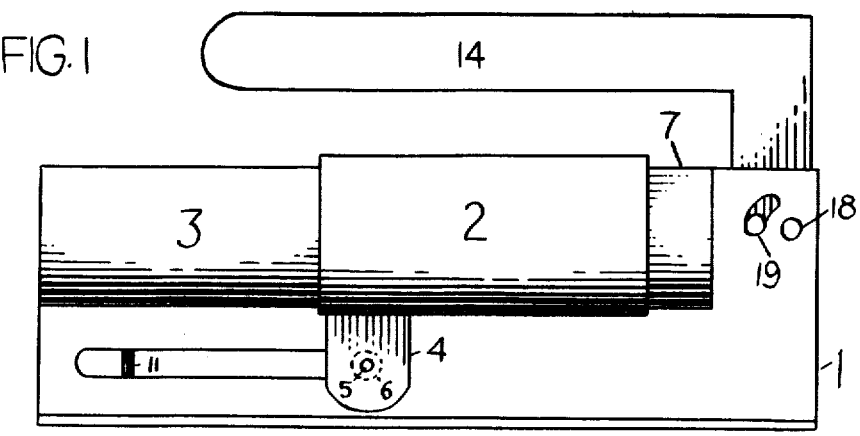
FIG. I
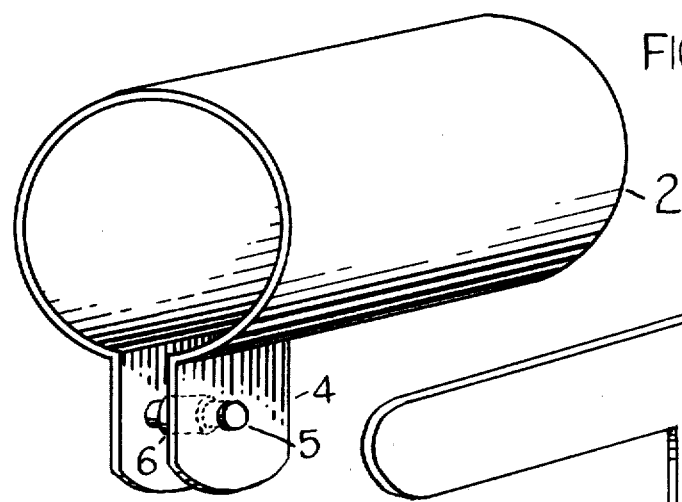
FIG. II
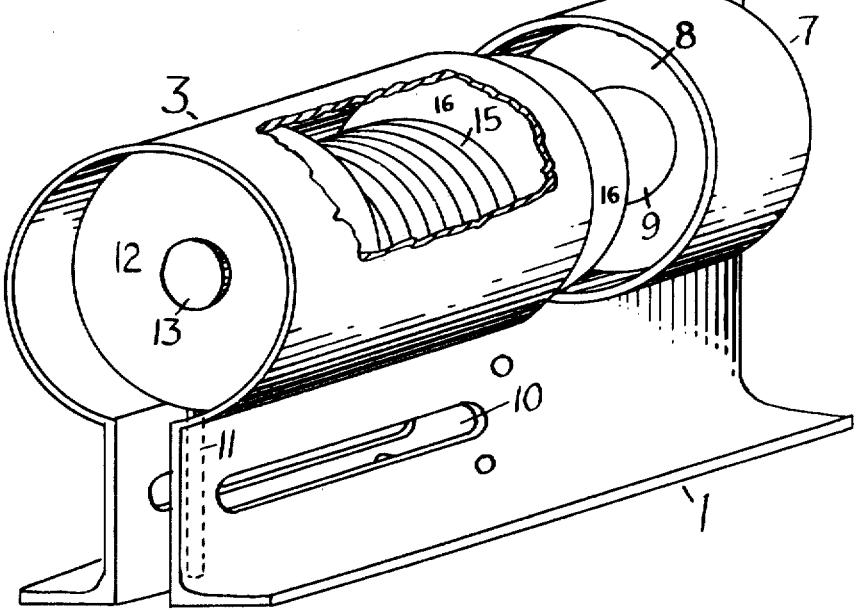
FIG. III

U.S. Patent  Feb. 1, 1983  Sheet 2 of 2  4,370,922
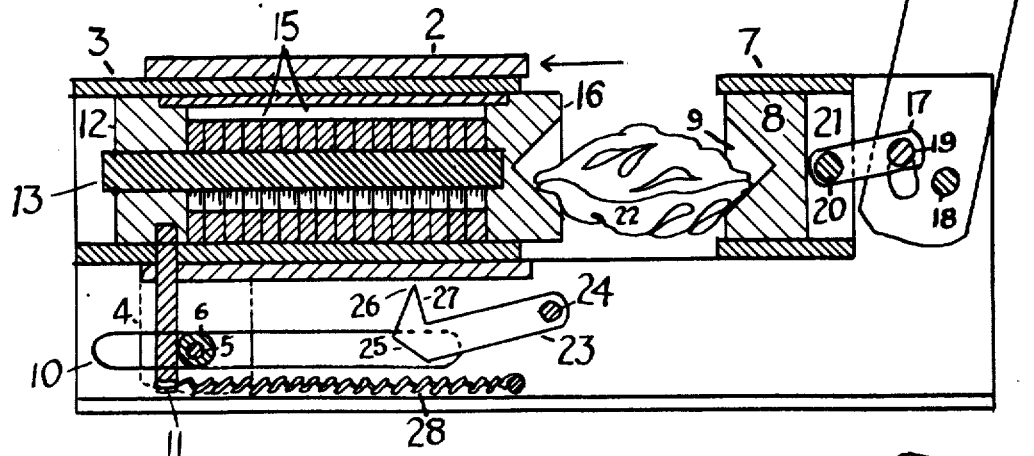
FIG. IV
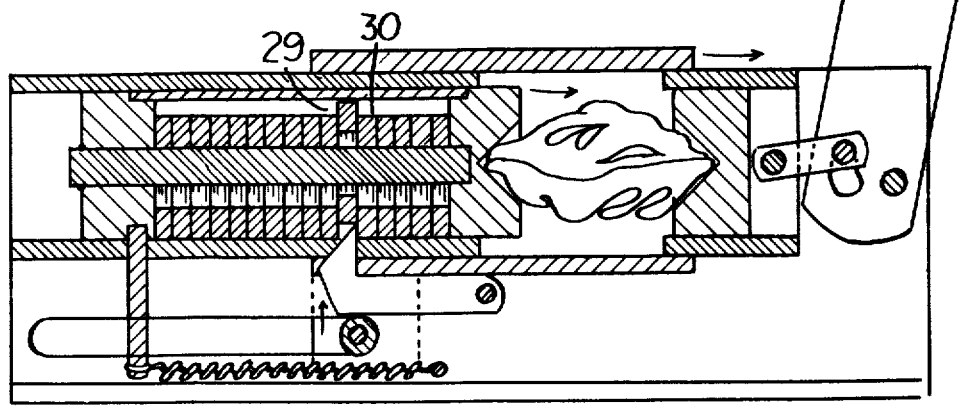
FIG. V
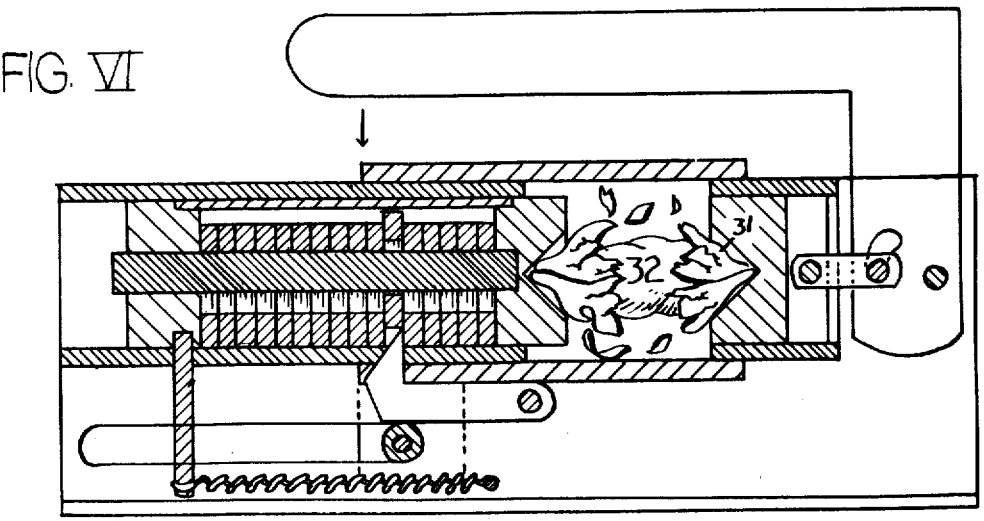
FIG. VI

NUTCRACKER

BACKGROUND OF THE INVENTION

The invention pertains to apparatus for treating food by separation of the outer portion. More specifically, the invention pertains to apparatus for removing the shells from nuts, especially "table nuts" such as pecans, filberts and Brazil nuts.

The nutcracker, as such, has long been known, of course. Many types are on the market, ranging from the familiar hand nutcracker to elaborate electrical contrivances. There is, however, still a need for a simple, efficient, home nutcracker which can be used when a large quantity of nuts must be cracked, for example in cooking.

In the case of nuts such as pecans, or other similar nuts, it is important to be able to crack the shell of the nut without damaging the meat inside, which is prone to break if the nut is "over cracked". When the nutmeats are to be used in cooking, and thus are needed in quantity, much time can be lost in picking pieces of shell apart from the broken nutmeat. Small pieces can be lost or wasted. Thus, it is an object of this invention to provide a nutcracker which can crack the shells of nuts with minimal damage to the meat.

The fact that nuts vary considerably in size aggravates the problem of accurate cracking. If the nutcracker incorporates an adjusting mechanism for size, as many do, much time is lost in adjusting the cracker to fit each nut. Moreover, mis-adjustment will result in broken nutmeat, and thus waste. It is, therefore, an additional object of this invention to provide a nutcracker which automatically adjusts to each size of nut.

It is an additional object of the invention to provide a self-adjusting nutcracker which is simple and inexpensive to build, but rugged and long-lasting in operation. In the past, these goals have been almost mutually exclusive. Most self-adjusting nutcrackers, and many manual ones, have utilized a ratchet and pawl arrangement to provide a latching action for one or both cracking jaws. This has several disadvantages. The size and spacing of the ratchet teeth determine the minimum adjustment possible. The larger the teeth and the spacing, the harder it is to adjust the device properly so as to accurately crack the nut. However, the price of making a ratchet increases dramatically as the tolerances become finer, producing a trade-off between price and efficiency. Further, the teeth on the ratchet are prone to wear, and eventually break off. Once broken, the ratchet is useless, and often irreplaceable. The teeth on a more accurate nutcracker become more delicate and liable to wear as the ratchet becomes finer. If a finer ratchet is to last, more expensive materials are required, thus increasing cost still further.

Some nutcrackers have used a friction locking system. With wear this may slip, and at best is less accurate and positive than a true locking system.

Still another problem in existing nutcrackers is safety of use. Most nutcrackers known to the art are capable of catching the fingers of the user in the mechanism. The faster the nutcracker, the more potentially dangerous. It is, then, a still further object of this invention to provide a nutcraker which is fast to operate, while still being safe to use.

Another object is to provide a nutcracker which is easy to use, fast, and efficient.

Other objects and advantages of the invention will become apparent upon further examination of this disclosure.

SUMMARY OF THE INVENTION

The present invention is a safe, efficient, self-adjusting nutcracker, which is especially adapted to cracking the shells of nuts such as pecans without damaging the nutmeat.

The nutcracker disclosed herein grips the nut between a movable piston and a receiver, which is biased toward the piston so as to hold the nut in place. The user activates a novel latching mechanism utilizing a lever latching against a stack of thin disks or plates, such as washers, to hold the receiver in position. The user moves the piston a limited distance by activating a handle connected to the piston through a toggle joint, or some other limited-movement arrangement. This limited movement enables the invention to crack the nut shell without harming the meat inside. For additional safety, the latching mechanism may be activated by closing a cover over the nut, shielding the operator from the moving parts.

BRIEF DESCRIPTION OF THE DRAWINGS

FIG. I shows the invention, with the cover in the closed position.

FIG. II shows the cover assembly.

FIG. III shows the nutcracker without the cover, with the receiver cover cut away to show internal details.

FIGS. IV, V, and VI show the step-by-step operation of the nutcracker in its preferred embodiment.

DESCRIPTION OF THE INVENTION

In each figure the reference numbers are the same, thus each number will always refer to the same part.

The invention is illustrated in its preferred embodiment. Its operation may best be understood through the three sectional views, FIGS. IV, V, and VI, with reference to FIGS. I through III for the actual appearance and arrangement of parts.

Looking at FIG. I, externally the nutcracker is made up of a base (1), receiver cover (3) and piston cover (7), which may be separate parts, or a single casting. The cover (2) slides over the receiver cover and piston cover and is detailed in FIG. II. The handle (14) activates the piston mechanism through internal arrangements.

In FIG. II the cover (2) is shown to be a hollow tube, circular in section (although any hollow shape which will slip over the receiver and piston covers, and is of suitable length to surround the gap between the two, will work). The body of the cover is split along the bottom so as to slip over the base, with a flange (4) on each side. Connecting the flanges is a cover pin (5) which fits through the slot (10) in the base. A roller (6) rides on the cover pin inside the base.

The receiver cover (3) is cut away in FIG. III to show the details of the receiver assembly. The receiver cover is rigidly attached to the base, while the internal parts are free to slide within the receiver cover. The receiver assembly comprises the receiver itself (16), which is a block containing a recess to hold the end of the nut to be cracked, and a number of relatively thin disk elements (15).

The disk elements have a thin circumferential edge and two parallel flat faces. The flat faces permit a number of disk elements to be placed together coaxially, with the flat faces of adjoining disk elements touching and circumferential edges aligned, forming a cylindrical assembly of disk elements. The flat faces of each disk element are free to slide along the flat faces of the adjoining elements, allowing the disk element to be pushed aside. When a disk element is so pushed, it will be apparent that the flat faces of the adjoining disks are exposed, and a gap is formed between the circumferential edges of the two disk elements adjoining the one moved.

In the preferred embodiment as illustrated, these elements are common ¾ inch diameter by ⅛ inch or 1/16 inch thick washers, but they may be any thin article with parallel flat faces. The thickness of the disks determines the smallest step in which the receiver may be locked. The disks must be of a smaller diameter than the receiver cover, as will be seen. The round shape of the disk has the advantage that the elements will thus tend to rotate in use and equalize the wear at all points around the circumference of the disk. Although the elements are referred to herein as "disks", it is to be understood that a thin plate or shim having parallel flat faces of any other cross-sectional shape may be used without sacrificing the advantages of the invention.

The receiver assembly is capped with an end piece (12), which serves to hold the disk elements (15) in place, and is fitted with a pin (11) by which the entire receiver assembly may be moved within the receiver cover. In the illustrated embodiment, a bolt or shaft (13) has been run through the center of the washers (15) from the end piece (12) to the receiver (16). If solid disks are used, or if desired, some other method of attaching the end piece to the receiver may be used. For example, a slotted tube of smaller diameter than the receiver cover could be run between the end and the receiver, enclosing the disks. It is only necessary that the disks be held in a parallel stacked arrangement, and that some means be provided for moving the receiver and disk stack as a unit.

The function of the parts of the invention will become clear in the following description of the step-by-step operation of the device, as shown in FIGS. IV through VI.

Beginning in FIG. IV, the first step in the operation of the nutcracker is illustrated. The handle (14) is in the "up" position, retracting the piston (8) into its cover (7). The cover (2) is pushed fully to the left, causing the cover pin (5) to push the receiver assembly (12, 13, 15, 16) back by pushing on the pin (11) attached to the receiver end (12) against the tension of the receiver spring (28). This opens the gap between the receiver (16) and the piston (8). A nut (22) is placed between the recesses (9) in the piston (8) and receiver (16).

Then (FIG. V) the cover (2) is closed. As it closes, the receiver spring (28) presses the receiver (16) snugly against the nut. The cover pin roller (6) rides along the angled sliding face (25) of the locking lever (23) causing it to pivot upwards on its pivot (24). The point (26) of the lever forces one (or more) disk element (29) upwards relative to its neighbors, as explained above, allowing the flat latching face (27) of the lever to catch on the thus exposed flat face of the adjoining disk element (30).

Finally (FIG. VI) the handle (14) is moved downwards. This causes the toggle joint formed by the toggle link (17), the handle (14) and the three pivot points (18, 19, 20) to slide the piston (8) into the nut a short distance, cracking the shell (31) without touching the meat (32). As illustrated, the piston travel is limited to ⅛ inch, but any short throw of that nature would work. As will be obvious to one skilled in the art, any other method of translating the pivotal motion of the handle into a sliding motion of the piston, such as an eccentric or cam, or a simple lever action with a stop to limit travel, may be substituted for the toggle joint.

Ideally, as shown in these drawings, the piston (8) does not protrude beyond the end of the piston cover (7) when fully extended. This guards against the user hurting himself if he gets his finger between the cover (2) and the piston cover (7). This is not essential to the invention, however.

The handle design illustrated allows the maximum force to be applied in a downward direction. Thus, the nutcracker has no tendency, common in the prior art, to "walk" along the table. Also, the maximum force in cracking the nut is applied in such a way that the user can press his weight into the handle, making the operation easier. Other handle designs can be used without departing from the teachings of the invention.

The design shown here, which is but one of the many possible designs incorporating the features of the invention, has the advantage that the locking mechanism cannot lock the receiver until the cover is closed. This prevents the user from squeezing his hand in the moving parts of the nutcracker. However, the cover can be omitted, at some loss in safety, and the lock lever can then be moved up into the washers in some other fashion. For example, a manual lock button may be added to the base, or the lock lever may be raised by cooperation with the handle mechanism.

Accordingly, it is to be understood that the embodiments of the invention herein described are merely illustrative of the application of the principles of the invention. Reference herein to details of the illustrated embodiment are not intended to limit the scope of the claims, which themselves recite those features regarded as essential to the invention.

I claim:

1. A nutcracker, comprising:
    a. base means for supporting the nutcracker;
    b. a receiver assembly mounted on the base means so as to be slidable along at least part of the length of the base means, comprising
        1. nut receiving means for holding an end of a nut to be cracked;
        2. a plurality of disk elements, each having two parallel flat faces and a thin circumferential edge;
        3. said disk elements being assembled with the flat faces of each disk element in slidable contact with a flat face of an adjoining element, such that the flat faces of each disk element can be made to slide along the flat faces of the adjoining disk elements;
        4. the assembly of disk elements being normally in a coaxial arrangement with the circumferential edges in alignment;
        5. said assembly of disk elements being attached to the nut receiving means for co-operative motion therewith;
        6. means for sliding the receiver assembly along the base means;
    c. piston means adapted for holding an end of the nut to be cracked, slidably mounted on the base means along the same axis of movement as the receiver assembly, such that the piston means and nut receiving means may hold opposite ends of the nut;
d. means for biasing the nut receiver assembly toward the piston means such that a nut inserted between the piston and nut receiving means is held firmly therebetween;
e. latching means attached to the base means for preventing slidable motion of the receiver assembly along the base means, holding said receiver assembly in its biased position against the nut, comprising
 1. raising means for contacting the circumferential edge of at least one of the receiver assembly disk elements, and moving said element out of its normal co-axial alignment relative to the others by causing said disk element to move slidably along the flat faces of the adjoining disk elements;
 2. said motion of at least one of the disk elements exposing at least part of one of the flat faces on at least one adjoining disk element;
 3. locking means for contacting said exposed flat face, whereby the slidable motion of the receiver assembly along the base means is prevented;
f. means for slidably moving the piston means toward the nut receiving means, locked into place by the latching means, cracking the nut held therebetween.

2. The nutcracker of claim 1, further comprising safety cover means for protecting the user from harm, and for holding the pieces of the cracked nut comprising:
a. shield means slidably mounted on the base means, slidably moving between an "open" and a "closed" position, said shield means being of suitable size to fully enclose the gap between the piston means and the nut receiving means when in the closed position;
b. means for sliding the receiver assembly along the base means when the cover means is moved from the closed to the open position, such that the receiver is held back against the biasing means, allowing insertion of a nut between the nut receiving means and the piston means;
c. means for engaging the latching means when the shield means is moved completely to the closed position.

3. The nutcracker of claim 1 in which the slidable motion of the piston means is limited to a short stroke, such that the nutcracker cracks only the shell of the nut without damaging the meat inside.

4. The nutcracker of claim 3 in which the piston means is enclosed in a piston cover means for shielding the piston, and the slidable motion of the piston means if further limited such that the piston means does not extend outside of the piston cover means.

5. The nutcracker of claim 3 in which the means for slidably moving the piston means comprises:
a. handle means pivotally mounted on the base means for translating user force into arcuate motion;
b. link means for sliding the piston means, having a pivot at each end, pivotally connecting the piston means and the handle means;
c. said link means being connected so as to form a toggle joint.

6. The nutcracker of claim 5 in which the handle means is horizontal when the piston means is fully extended, such that the user exerts maximum force in a downward direction.

7. The nutcracker of claim 1 in which the disk element are washers.

* * * * *